United States Patent [19]

Lupo et al.

[11] Patent Number: 4,576,264
[45] Date of Patent: Mar. 18, 1986

[54] SERVO CLUTCH MECHANISM, AND THE DRIVE GEAR INCORPORATING SAME

[75] Inventors: Giorgio Lupo, Rivalta; Pier C. Capra; Aldo Marcarino, both of Turin, all of Italy

[73] Assignee: S.O.M., S.p.A., Reggio Emilia, Italy

[21] Appl. No.: 556,852

[22] Filed: Dec. 1, 1983

[51] Int. Cl.[4] .................. F16D 21/06; F16D 13/42
[52] U.S. Cl. .................... 192/48.91; 192/54; 192/93 A
[58] Field of Search ............ 192/48.91, 51, 53 F, 192/53 E, 53 G, 93 A, 54

[56] References Cited

U.S. PATENT DOCUMENTS

| 2,547,732 | 4/1951 | Baker | 192/48.91 |
| 3,118,292 | 1/1964 | Schroter et al. | 192/54 |
| 3,703,226 | 11/1972 | Strehler et al. | 192/93 A |
| 4,118,996 | 10/1978 | Eichinger | 192/48.91 |
| 4,287,973 | 9/1981 | Eichinger | 192/54 |
| 4,425,990 | 1/1984 | Griesser | 192/53 F |

Primary Examiner—Henry C. Yuen
Attorney, Agent, or Firm—Laff, Whitesel, Conte & Saret

[57] ABSTRACT

The clutch mechanism is servo-assisted, comprising means for engaging and disengaging drive with full engine torque in play, yet requiring a minimum of effort at the control. Applications include the type of forward-&-reverse drive gear as used in the transmissions of marine engine-and-screw propeller units.

8 Claims, 4 Drawing Figures

SERVO CLUTCH MECHANISM, AND THE DRIVE GEAR INCORPORATING SAME

BACKGROUND OF THE INVENTION

The invention described herein relates to a clutch mechanism of the type comprising an input shaft and an output shaft, a primary gear wheel driven by the input shaft, a secondary gear wheel turning with the output shaft, a clutch assembly whose engaging-component may shift axially against the agency of sprung means so as to engage said primary and secondary gear wheels, and a control collar turning with said secondary gear wheel, shifting axially with respect thereto, and assuming both a non-working and a working position, the latter being that in which its action on said clutch engaging-component is brought to bear.

The object of the invention as set forth herein is that of providing a clutch mechanism of the type aforesaid, capable of engaging and disengaging under torque whilst requiring but limited effort for its control.

SUMMARY OF THE INVENTION

The object aforesaid is realized by the invention described herein, which relates to a clutch mechanism of the type aforementioned, characterized in that it comprises:

- an intermediate wheel fitted to the secondary gear and capable of turning through a limited angle with respect thereto against the agency of sprung means so as to reach a limit beyond which said secondary gear will be caused to turn by said intermediate wheel;
- a ring set so as to free-wheel in fixed axial position on said secondary gear and having a frontal cam profile;
- means for causing said ring to rotate as one with said secondary gear when the control collar is in working position;
- a number of thrust elements located in axial holes at said intermediate wheel, and sliding therein whilst having one end in contact with the cam profile of said ring and the remaining end directed toward the clutch's engaging component;

said clutch mechanism being designed to engage said primary gear and intermediate wheel following movement of the control collar into working position, thus causing said intermediate wheel to turn through a limited angle with respect to said secondary gear as aforesaid, against the agency of the sprung means;
said frontal cam profile offered by said ring being of shape such that in bringing about this limited angle of turn, the thrust elements aforementioned will each travel an incline disposed in such a way as to urge the element itself in an axial direction, toward said engaging-component.

The clutch mechanism to which the invention relates is thus able—by virtue of the features aforedescribed—to shift to and from engaged and disengaged state whilst subjected to torque, and do so in response to a limited effort imparted at its control medium. Clutch-mechanisms of the type as set forth herein can be utilized to advantage in drive-transmissions wherein a requirement may exist for varying transmission ratios between driving and driven member.

An application of particular interest to which the invention lends itself would be reversing gear designed to incorporate two such clutch mechanisms enabling transmission from driving to driven member in either forward or reverse direction (i.e. of rotation).

An advantage of the invention described herein is that it will permit transmission of drive both from the input to the output shaft, and from the output to the input shaft (i.e. inverted).

BRIEF DESCRIPTION OF THE DRAWINGS

Further features and advantages will emerge more clearly from the detailed description of a preferred embodiment of the invention which follows, this illustrated as a strictly unlimitative example with the aid of accompanying drawings, in which.

DESCRIPTION OF THE PREFERRED EMBODIMENT

Figure 1:
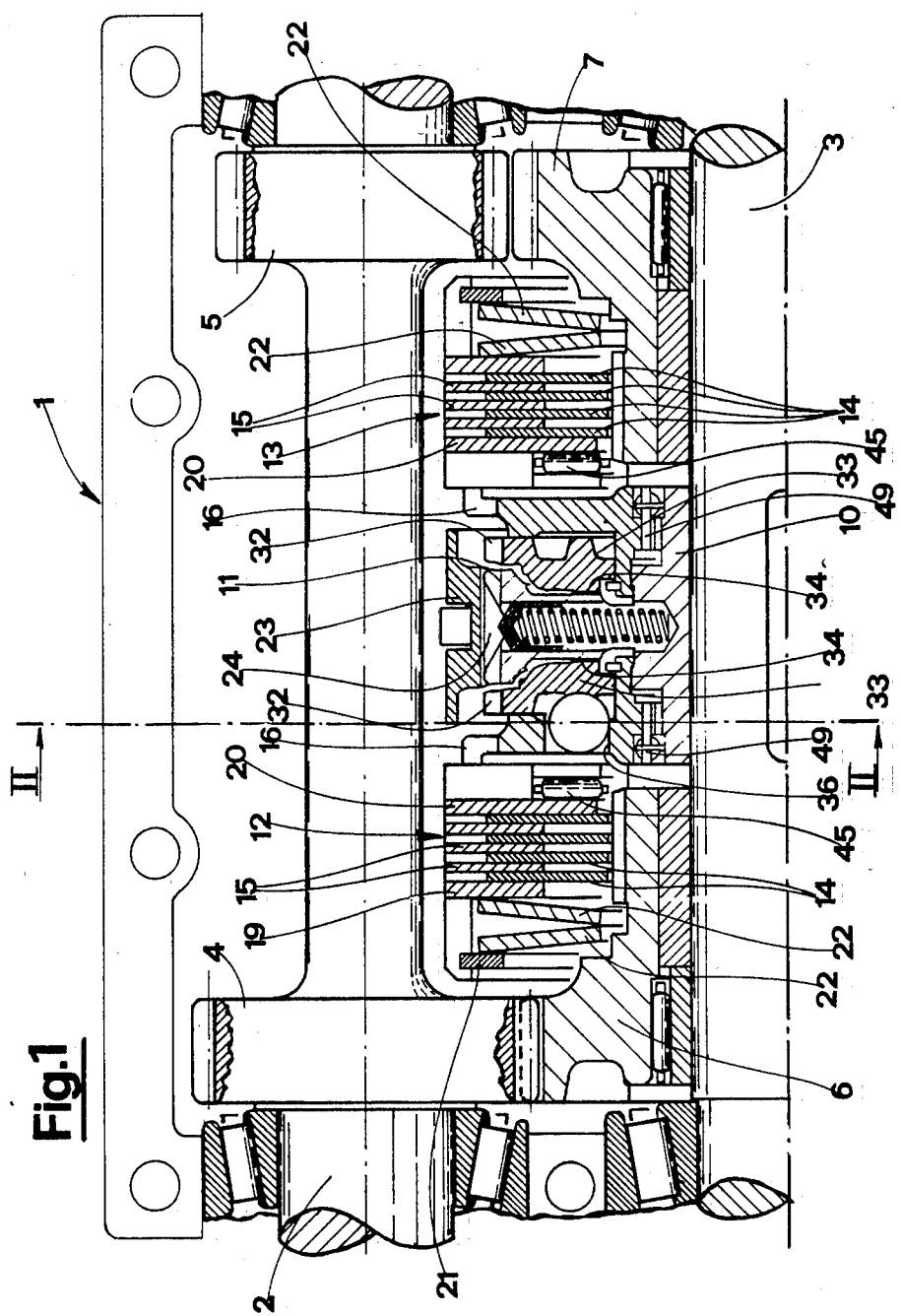
FIG. 1 is a section through forward-&-reverse drive gear making use of a pair of clutch mechanisms as described herein.

With reference to FIG. 1, 1 denotes the forward-&-reverse drive gear above mentioned, which comprises an input shaft 2 and an output shaft 3. While it is envisaged that drive gear 1 transmit from input shaft 2 to output shaft 3 in either direction of rotation, the description will reveal that the same drive gear 1 is equally able to transmit from shaft 3 to shaft 2—likewise in either direction of rotation.

In the drawings, input shaft 2 has two gears 4 and 5 fitted, which drive respective primary gears 6 and 7 in opposing directions. Primary gears 6 and 7 are mounted free-wheel to output shaft 3 via rolling bearings 8, and whereas gear 4 meshes direct with primary gear 6, gear 5 and primary gear 7 mesh via a further gear not illustrated in the drawing.

The drive gear further comprises a secondary gear 9 turning as one with output shaft 3 and incorporating a hub 10, and external teeth 11.

12 and 13 denote two clutch mechanisms designed to engage secondary gear 9 with either one of respective primary gears 6 and 7, transmitting drive from input shaft 2 to output shaft 3, or viceversa, in whichever direction of rotation. The two assemblies denoted by 12 and 13 are identical, and therefore carry the same set of reference numbers—thus, for the purposes of description, clutch mechanism 12 will be referred to only, for simplicity's sake.

The embodiment illustrated incorporates a multiple-disk type clutch, the single assemblies having a first set of disks 14 mounted via a prismatic sliding pair so as to move back/forth axially along and with respect to the hub of primary gear 6, and a second set of disks 15 likewise mounted via a prismatic sliding pair to the inner cylindrical wall of an intermediate wheel embodied in the form of a bell-housing 16 mounted free-wheel to the hub 10 of secondary gear 9.

Figure 2:
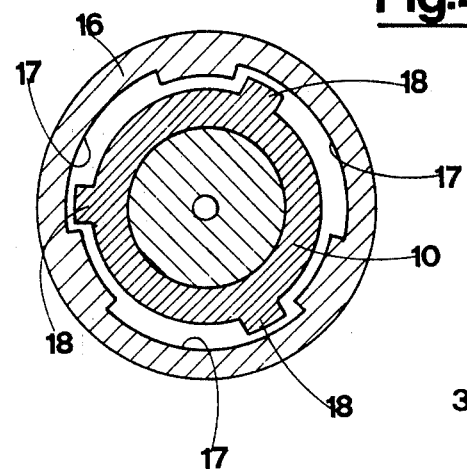
FIG. 2 is a section through II—II in FIG. 1.
Figure 3:
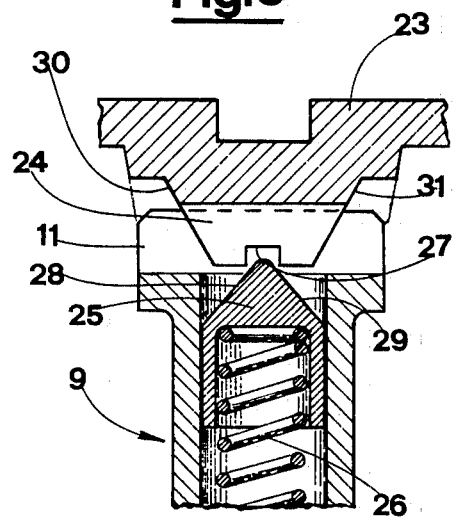
FIG. 3 is a detail of FIG. 1 on larger scale.

As may be seen from FIG. 2, said intermediate wheel 16 has an internal surface offering recesses 17 in which sprags 18 issuing from hub 10 may turn through a limited angle of rotation with respect to secondary gear 9. Three coil springs 49 urge the intermediate wheel 16 into the position assumed with respect to hub 2 as shown in FIG. 2.

The two sets of disks 14 and 15 incorporated into clutch mechanism 12 are housed between elements 19 and 20 which are also associated with the cylindrical wall of intermediate wheel 16 via a prismatic sliding pair, whilst two springs 22 located between element 19 and a plate 21 fixed to wheel 16 oppose movement leftward of element 19 as illustrated in FIG. 1 (clutch-mechanism 12).

It will be observed from FIG. 1 that springs 22 are loaded against respective shoulders 50.

The drive further comprises a control collar 23 rotating as one with said secondary gear 9 and able to slide axially with respect thereto; the association of these two being via internal teeth 24 on collar 23 which engage external teeth 11 aforesaid.

FIG. 1 illustrates the control collar in its central, neutral position, from where it may be moved into two working positions in which, moving toward either end of the drive gear, it will come up against the respective clutch mechanism's engaging-component 20.

25 denotes the only one illustrated of a number of radial locating-elements housed within secondary gear 9 and capable of sliding thus, urged constantly against the inner surface of control collar 23 by a relative coil spring 26. Whenever the collar is brought into its central, neutral position as illustrated, each of said locating-elements 25 will snap into a corresponding seat 27 offered by the inner surface of said collar. Said locating-elements 25 also exhibit two canted surfaces 28 and 29 designed to interact with respective corresponding surfaces 30 and 31, likewise canted and issuing from said inner surface of collar 23. Thus, when the control collar is moved away from central position so as to cause mating of surface 29 with surface 30, or of 28 with 31, coil springs 26 will tend to assist such movement away from central position by urging across the line through which said canted surfaces mate and pushing the collar toward the respective clutch-mechanism.

In moving away from center, the control collar will interlock its internal teeth 24 with external teeth 32 offered by a ring 33 mounted free-wheel on hub 10 aforementioned—one such ring being provided for either of clutch-mechanisms 12 and 13. The two rings 33 are similar in all respects, and lie in fixed axial position inasmuch as each one offers a flat mating surface at either side to correspondingly-placed frontally-disposed surfaces incorporated into respective intermediate wheels 16 and into the walls of secondary gear 9. The mate between flat surfaces of ring 33 and gear 9 is denoted 34, whilst at the opposite side of ring 33 to where it breasts via 34 with the secondary gear, one has the frontal cam profile aforementioned—this denoted 35 and to be described in due course, though the developable profile of the cam itself will be seen rolled out in FIG. 4.

Each intermediate wheel 16 is provided with a set of circumferentially-disposed axial holes 36—one only of which being visible in FIG. 1—accommodating a ball-type thrust element 37 each whose one end makes contact with said frontal cam 35 offered by ring 33, and whose remaining end is designed to act on said engaging-component 20 via a thrust bearing 45.

Another possible way of embodying the mate at 34 (not illustrated) would be through matching conical surfaces, likewise breasted.

The forward-&-reverse drive thus composed functions as follows—assuming transmission from input shaft 2 to output shaft 3, in which case there will be a prime mover attached to input shaft 2, and a service to output shaft 3: (an ideal example of which would be the screw driven by a marine engine, although the drive gear as described may serve equally well for any application of related type, including those where drive is transmitted from shaft 3 to shaft 2)—with the control collar 23 in its central, neutral position illustrated in FIG. 1, both clutch-mechanisms 12 & 13 are disengaged, and input shaft 2 will simply turn the two primary gears 6 and 7 in opposite directions whilst secondary gear 9 fixed to output shaft 3 remains isolated from both the latter.

For secondary gear 9 to engage with primary gear gear 6, control collar 23 needs to shift to the left (as viewed in FIG. 1), this being achieved by applying slight pressure thereto sufficient to displace locating-elements 25 from their seats 27 by urging them against their single springs 26 whereupon canted surfaces 28 offered by said locating-elements 25 will be caused to mate with canted surface 31, offered by collar 23. This condition being produced, the agency of the same springs 26 will be instrumental in urging said collar further left toward its full-travel position, in which it will come up against thrust-bearing 45, and thus exert axial pressure on the clutch-mechanism's engaging component 20.

Pressure thus exerted on engaging-component 20 by control collar 23 will in turn cause disks 14 and 15 to draw together against the agency of springs 22, and in the same moment, the collar's own internal teeth 24 will be caused to interlock with the external teeth 32 on free-wheel ring 33 by sliding in—which now causes ring 33 to turn as one with secondary gear 9.

The shift produced as thus described causes an initial imparting of movement to intermediate wheel 16 by primary gear 6, whereupon intermediate wheel 16 will depart from the nondriving position illustrated in FIG. 2 and turn—against the agency of the three springs 49 aforementioned—toward the farther limit imposed by sprags 18, beyond which it will begin driving secondary gear 9.

As intermediate wheel 16 is turned from its non-driving position into its driving position through the limited angle already described, each one of the thrust-elements 37 will travel a respective incline 38 offered by the frontal cam 35 incorporated into ring 33, said incline 38 being angled such as to urge said thrust-element 37 in an axial direction, toward the clutch-mechanism's engaging component 20. The pressure imparted in this fashion brings about an increase in torque as applied by primary gear 6 to intermediate wheel 16, and the effect is that of causing intermediate wheel 16 to turn still further with respect to secondary gear 9, thus increasing pressure exerted by said thrust-elements 37 on engaging-component 20. Torque applied by primary gear 6 to intermediate wheel 16 is now increased still further, and axial pressure on component 20 from thrust elements 37 likewise, and so forth. In this way, one is provided with a mechanical servo-assistance whilst the effort required for initial shift is minimal.

Figure 4:
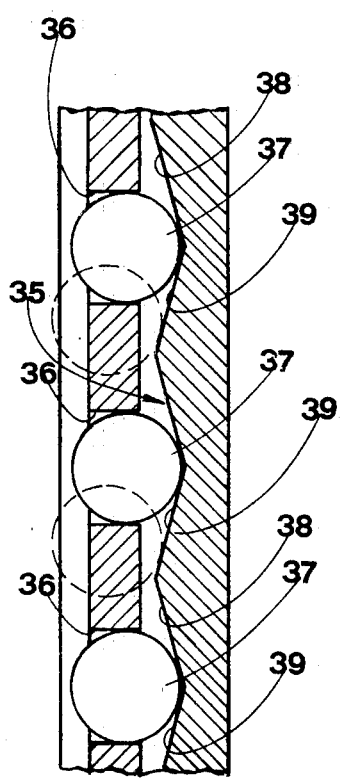
FIG. 4 shows the cam profile's developable surface rolled out into a plane, with adjacent parts.

The cam surface 35 offered by each ring 33 is embodied such that following the thrust-and-torque build-up as described above, and arrival of intermediate wheel 16 up at its limit, or driving position with respect to secondary gear 9, the single thrust elements 37 will be brought to rest in a given position, or—as is the case in the preferred embodiment—will be carried onto a second incline 39 of like angle to incline 38 but facing in the opposite direction (see FIG. 4). This causes intermediate wheel 16 to lock fast in the driving position, and holds the clutch-mechanism 12 locked fast at the same time (FIG. 2 shows wheel 16 in the non-driving position with respect to hub 10 of the secondary gear).

With the clutch-mechanism in this state, drive can be transmitted inversely from shaft 3 to shaft 2, and this being the case, incline 39 will urge thrust-element 37 in an axial direction against said engaging component 20 thus locking fast the entire mechanism 12. Clearly, maximum transmissible torque on inverse drive will be that produced at the moment the thrust element is carried over onto incline 38, whereupon clutch-mechanism 12 will be released and allowed to re-engage primary gear 6 and intermediate wheel 16 as before.

Generally speaking, the degree of maximum torque transmissible with inverse drive is less than that which will be produced direct, though an increase may be had in some measure by steepening the angle of incline 39.

Once back in the state where thrust element 37 rides on incline 38, secondary gear 9 and output shaft 3 will be driven direct by intermediate wheel 16—this turning as one with primary gear 6 via clutch-mechanism 12.

Clearly, shifting control collar 23 in the opposite direction (as viewed in FIG. 1, right instead of left), clutch-mechanism 13 will duly be engaged, and rotation of output shaft 3 produced, in the opposite direction.

Assuming the drive gear with clutch-mechanism 12 still engaged, disengagement is brought about by control collar 23 being shifted back to center. This causes the collar's own internal teeth 24 to disassociate from teeth 32 of the relative free-wheel ring 33, which then returns to idling around hub 10. At the same time, springs 22 urge elements 19 and 20, with disks 14 and 15, back toward the position as illustrated in FIG. 1; springs 49 return intermediate wheel 16 to the non-driving position as illustrated in FIG. 2; and ring 33 resumes its position with respect to thrust-elements 37 as illustrated in FIG. 4.

The effort required to disengage the clutch—in other words, to recenter control collar 23, is simply that necessary to overcome pressure exerted on locating-elements 25 by their respective springs 26, and friction between teeth 24 and teeth 32. Such friction will not in effect amount to any considerable value, being equivalent to torque generated through thrust via elements 37 on ring 33, minus torque generated through friction at the breasted surfaces 34 of ring 33 and secondary gear 9. This being the case, it follows naturally enough that, the greater the torque generated through friction at 34, the less the clutch-disengement effort needed; and to this end, these same breasted surfaces may be embodied as conical frusta.

Again, a further design factor influencing operation of the invention when carried into effect, is the angle at which inclines 38 and 39 are ultimately set, in embodying the cam profiles 35 of each ring 33.

Although the preferred embodiment illustrates drive gear utilizing a pair of clutch-mechanisms as described herein, it will be clear that such a clutch-mechanism is well-suited to drive-system applications generally, and can be incorporated to advantage in any such system where a requirement exists for engage-&-disengage under torque, made possible by applying but limited effort to the control medium.

As the description shows, a further advantage of the clutch mechanism to which the invention relates is that it transmits maximum transmissible torque from driving to driven member (driving torque) and transmits a given proportion of such torque when driven member becomes driving member (braking torque).

Numerous modifications of a practical nature may be made to constructive details of the invention when ultimately carried into effect, without by any means straying from within bounds of protection afforded to the concept by claims appended—for instance, the friction components of the clutch-mechanism itself might be conical frusta instead of the disks described.

What is claimed:

1. A servo-assisted clutch mechanism comprising an input shaft, an output shaft, a primary wheel or gear driven by said input shaft, a secondary gear turning with said output shaft as one, a clutch mechanism whose engaging component may shift axially against the agency of sprung means so as to engage said primary and secondary gears, a clutch control collar turning as one with said secondary gear, shifting axially with respect thereto, and assuming both a non-working and a working position, the latter being that in which its action on said clutch engaging-component is brought to bear, an intermediate wheel fitted to said secondary gear and capable of turning through a limited angle with respect thereto against the agency of sprung means so as to reach a limit beyond which said secondary gear will be driven by said intermediate wheel;

a number of thrust elements located in axial holes at said intermediate wheel and sliding therein whilst having one end in contact with a frontal cam offered by said ring and the remaining end directed toward said clutch-mechanism's engaging-component;

said clutch-mechanism being designed to engage said primary gear with said intermediate wheel into working position, thus causing said intermediate wheel following shift of said control collar into working position, thus causing said intermediate wheel to turn through a limited angle with respect to said secondary gear; said frontal cam being of shape such that in bringing about turn through a limited angle of intermediate wheel as aforesaid, said thrust elements will each travel an incline disposed in such a way as to urge same in an axial direction against the clutch-mechanism's said engaging component; the improvement comprising— a ring mounted free-wheel in fixed axial position on said secondary gear and having the frontal cam profile; and means for causing said ring to rotate as one with said secondary gear when said control collar is in said working position.

2. Clutch-mechanism as in claim 1 wherein its control collar exhibits internal teeth constantly interlocked with external teeth offered by said secondary gear and designed to interlock additionally with external teeth offered by said ring.

3. Clutch mechanism as in claim 1 wherein the friction components thereof are conical frusta.

4. Clutch-mechanism as in claim 1 wherein said ring offers a frontal surface at the opposite side of same to said frontal cam, which mates by sliding contact with a corresponding surface offered thereto by said secondary gear.

5. Clutch mechanism as in claim 4 wherein said surface which mates by sliding contact, is flat.

6. Clutch mechanism as in claim 4, wherein said surface which mates by sliding contact, is conical.

7. Clutch mechanism as in claim 1 wherein the frontal cam offered by said ring is of shape such that in bringing about rotation of said intermediate wheel through a limited angle with respect to said secondary gear, each of said thrust-elements travels a first incline angled such as to urge same in an axial direction against the engaging component of its relative clutch-mechanism, and such that on arrival of said intermediate wheel at its limit of travel through said limited angle beyond which said secondary gear is driven in rotation thereby, said thrust element is carried over onto a second incline angled in the opposite direction to said first incline, thus causing said intermediate wheel to lock fast at said limit of travel with respect to said secondary gear.

8. Forward-&-reverse drive gear as in claim 7, wherein said second incline is set at a steeper angle that that of said first incline in order to obtain a relatively high maximum transmissible torque value when drive imparted by said input shaft to said output shaft is inverted such that the latter becomes driving member.

* * * * *